G. D. HAINES

March 8, 1932. TILED WALL OR THE LIKE Re. 18,376

Original Filed Feb. 23, 1928

Inventor:
George D. Haines,
By Chindahl Parker & Carlson
Attys.

Reissued Mar. 8, 1932

Re. 18,376

UNITED STATES PATENT OFFICE

GEORGE D. HAINES, OF PARK RIDGE, ILLINOIS, ASSIGNOR, BY MESNE ASSIGNMENTS, TO PORCELAIN TILE CORPORATION, OF CHICAGO, ILLINOIS, A CORPORATION OF DELAWARE

TILED WALL OR THE LIKE

Original No. 1,704,537, dated March 5, 1929, Serial No. 256,102, filed February 23, 1928. Application for reissue filed February 13, 1931. Serial No. 515,636.

This invention relates to the production of tiled surfaces of the general type disclosed in my Patent No. 1,594,614, dated August 3, 1926. The construction shown in said patent comprises a foundation sheet having grooves to receive marginal flanges upon enameled sheet metal tile.

The present invention relates more particularly to the substitution for the grooves and flanges, of locating means which shall involve less expense than the grooving of the foundation sheet and which shall not weaken the foundation sheet.

This object I attain by providing on the margins of the tiles tangs which are adapted to fit into rows of holes formed in the foundation sheet.

In the accompanying drawings.

Figure 1:
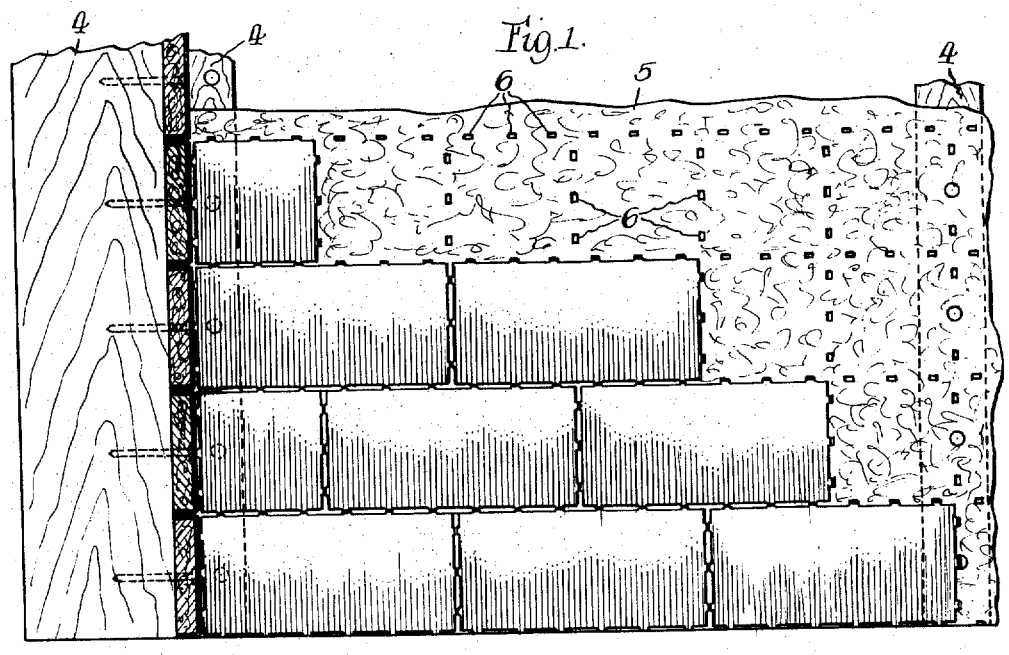
Figure 1 is a fragmental view, partly in section and partly in elevation, of a tiled structure embodying the features of my invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 2:
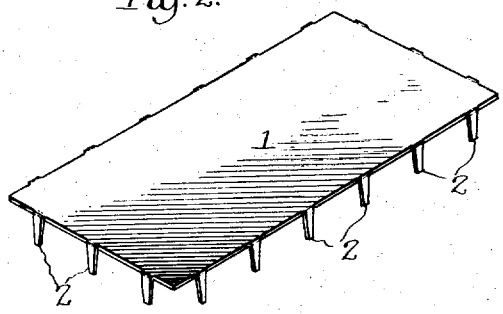
Fig. 2 is a perspective view of one of the enameled sheet metal tiles.

As shown in Fig. 2, the tile consists of a metal plate 1 having marginal rearwardly extending relatively slender tangs 2 which are integral with the plate 1. The outer surface of the plate 1 and the lugs 3 are coated with vitreous enamel, the inner side of the tile preferably also being enameled. While the tiles may be of various dimensions, they are preferably of the same width and length as standard clay tile, namely, three inches wide and six inches long, the tangs 2 being approximately three-sixteenths inches long.

The wall or other surface to be tiled may be of any preferred construction. Herein I have shown a framework comprising the usual vertical wooden studs 4. Upon the studs is nailed or otherwise secured a foundation sheet 5 of any suitable fibrous or mineral materal. In practice, shims (not shown) are inserted between the studs and the sheet 5 wherever necessary to produce a substantially true plane surface. The sheet 5 is provided with rows of holes 6 properly spaced to receive the tangs 2, which rows of holes are arranged to present or designate a symmetrical series of geometrical figures, such as the squares shown in Fig. 1. These holes may be easily formed in any suitable manner, as for example, by placing a sheet or large portion of the sheet in a machine adapted to punch a large number of holes at one time. The holes preferably extend entirely through the sheet so that either side of the sheet may be utilized to receive the tile.

The sheet 5 having been secured in place on the studs 4, the tiles are successively coated on their backs and tangs 2 with a suitable cement and set against the sheet 5, with the tangs 2 inserted in the holes 6 thereby increasing the permanency of the union between the tiles and the sheet. The holes 6 also indicate the proper location of the tiles with reference to both horizontal and vertical lines, in consequence of which the setting of the tiles involves no particular skill and may be rapidly effected. Because of the thinness of the layer or film of cement between the tiles, no attempt has been made to indicate said film in the drawings.

The vertical dimension of the sheet 5 is preferably a multiple of the width of a tile plus suitable allowance for the film of cement between adjacent tiles. The horizontal dimension of the sheet in the preferred form is a multiple of sixteen inches, the usual spacing of the studs 4. The sheet may be of any desired thickness which will afford sufficient rigidity.

The spacing of the rows of holes 6 will, of course, correspond to the dimensions and desired arrangement of the tiles, the width of each hole being preferably slightly greater than twice the thickness of the tangs 2. As previously mentioned the surface of the sheet presents a symmetrical series of similar geometrical figures. Consequently, during the tile setting operation, the use of tiles of various lengths, which are generally multiples of the dimensions of the geometrical figure designated by the holes, permits a great variety of geometrical figures or mosaics to be formed. Pleasing variations also may be obtained by using tiles of various colors, or by arranging plain or colored tiles to form borders for the tiled surface. Since the positions of the tiles are determined by the rows of holes, the only skill required in producing a design is the ability to follow a pattern.

It will also be apparent that a construction has been provided in which the lines of holes may be formed rapidly and inexpensively, and that such lines of holes will not materially weaken the board.

I claim as my invention:

1. A tiled structure consisting of the combination of a supporting structure, a sheet secured to said structure, said sheet having therein a plurality of rows of equidistant holes, and a plurality of tiles covering said sheet and cemented thereto, said tiles having members extending into said holes to locate the tile.

2. A tiled wall comprising a plurality of studs, a foundation sheet secured to said studs, said sheet having in its face a plurality of parallel rows of holes, and a plurality of metal plates covering said sheet and cemented thereto, each of said metal plates having a plurality of rearwardly extending projections thereon adapted to engage the holes in said sheet.

3. A tiled wall comprising a framework, a sheet secured to said framework, said sheet having in its face a plurality of holes arranged in rows to designate a number of geometrical figures on the face of said sheet, a plurality of tiles covering and cemented to said sheet, and a plurality of means on said tiles extending into said holes properly to position said tiles on said sheet.

4. A tiled wall comprising the combination of a supporting structure, a sheet secured to said structure, said sheet having a plurality of rows of holes therein extending through said sheet to permit either face of said sheet to be exposed, and a plurality of tiles covering said sheet and cemented thereto, said tiles having members thereon extending into said holes to locate said tile on the face of the sheet.

5. The combination of a foundation sheet and a multiplicity of individual vitreous-enameled sheet-metal tiles covering the sheet, said tiles having relatively slender marginal tangs penetrating the sheet.

6. A tiled structure consisting of the combination of a supporting structure, a sheet secured to said structure, said sheet having tile-locating characteristics, and a multiplicity of individual vitreous-enameled sheet-metal tiles covering the sheet, said tiles having relatively slender marginal tangs penetrating the sheet at the points indicated by said tile-locating characteristics.

7. A vitreous-enameled tile formed of a single piece of sheet metal and having on each of its edges a relatively slender tang which is integral with said piece of sheet metal and which extends rearwardly therefrom at a right angle thereto.

In testimony whereof I have hereunto affixed my signature.

GEORGE D. HAINES.